March 8, 1949.  A. R. SCHULZE  2,464,102
RESILIENT WHEEL
Filed Aug. 28, 1945  2 Sheets—Sheet 2
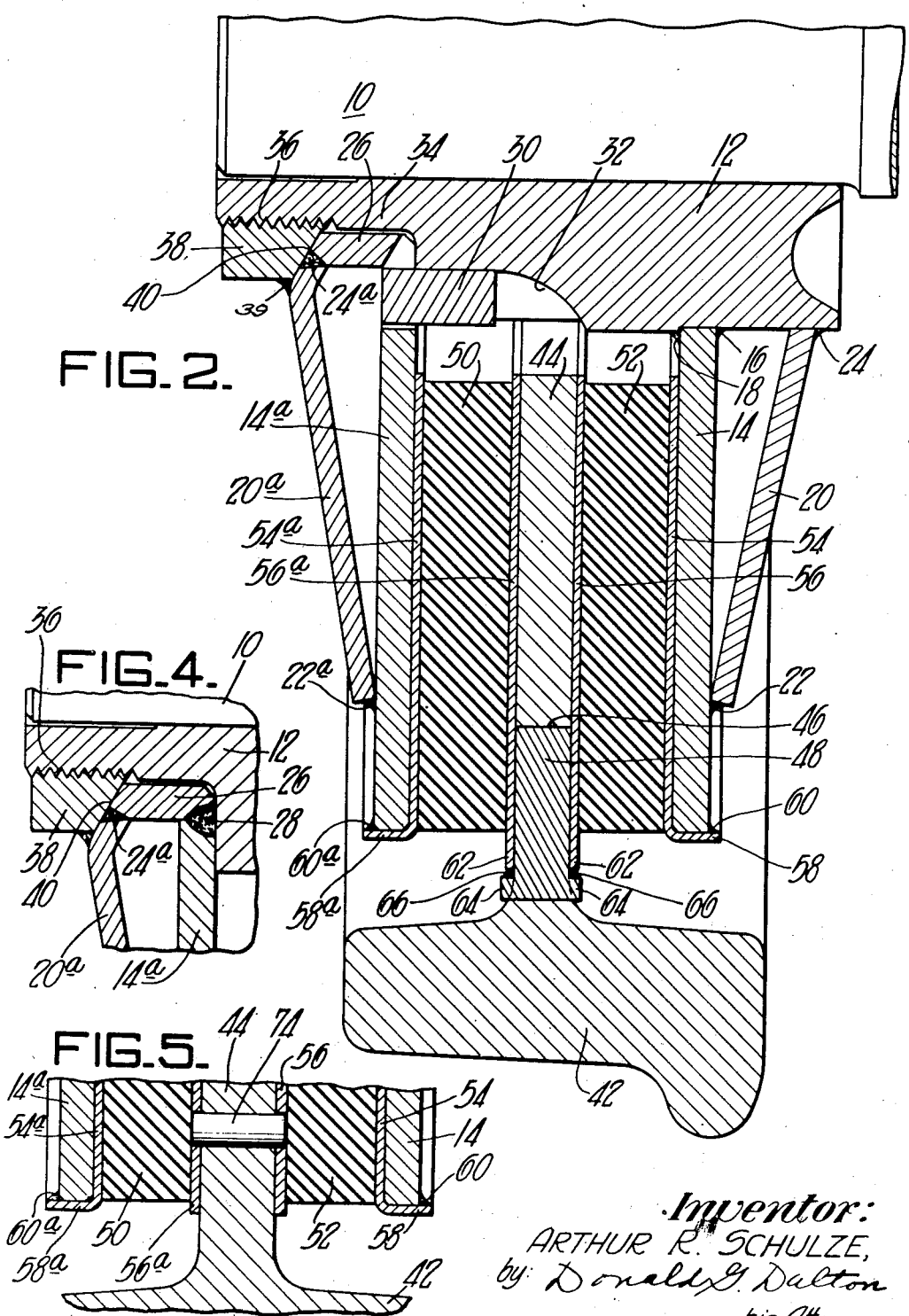
Inventor:
ARTHUR R. SCHULZE,
by Donald G. Dalton
his Attorney.

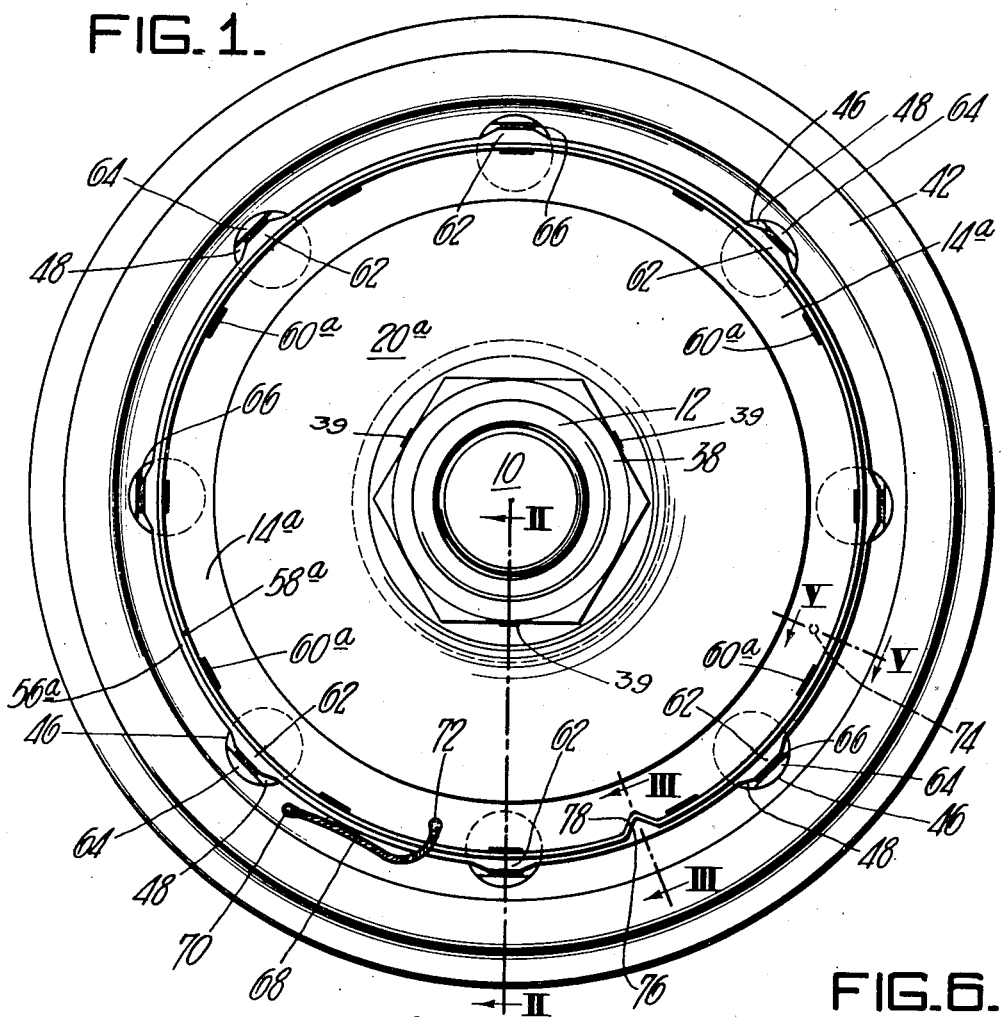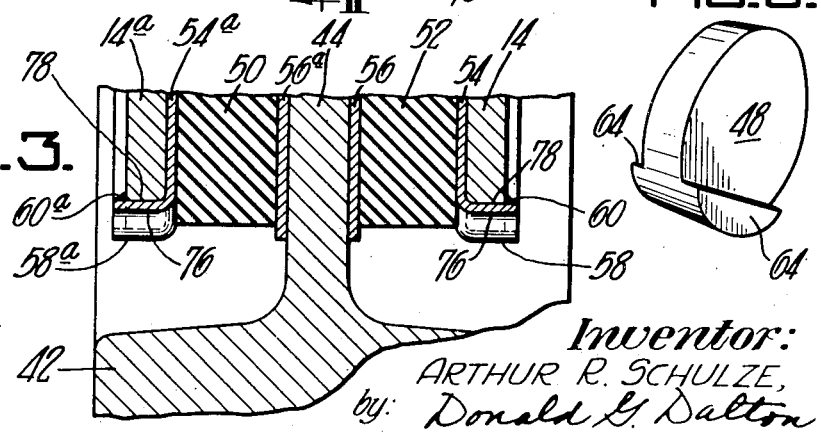

Patented Mar. 8, 1949

2,464,102

UNITED STATES PATENT OFFICE 2,464,102

RESILIENT WHEEL

Arthur R. Schulze, Johnstown, Pa., assignor to Carnegie-Illinois Steel Corporation, a corporation of New Jersey Application August 28, 1945, Serial No. 613,078

4 Claims. (Cl. 295—11)

The present invention relates to improved features of construction and arrangement of the component parts of a resilient wheel.

One object of the invention is to provide a resilient wheel in which the rubber cushion members are entirely devoid of cut-outs, openings other than the center hole, dowels, protuberances or projections of any kind.

Another object is to provide a wheel construction in which the cushion members are flat faced annular rings having continuous unbroken inner and outer edges.

A further object is to provide a resilient wheel having the novel features of structure and arrangement hereinafter set forth in detail to facilitate assembly by the use of seams of weld metal so located that the welding heat will not deleteriously affect the rubber cushions.

A further object is to provide a wheel construction for street railway use consisting of a high carbon steel rim tread having integral radial web of high carbon steel and to provide in the web a series of inserts of low carbon steel to facilitate the welding of face plates secured to the cushions of the wheel structure without deleteriously affecting the wear resisting characteristics of the high carbon steel wheel rim and web.

A further object is to provide a resilient wheel comprising a rim having inwardly extending web resiliently supported from a central hub by means of a plurality of rubber cushions having steel face plates vulcanized or otherwise secured thereto, the inner face plates of the cushions frictionally engaging the web of the wheel and the outer face plates of the cushions engaging cheek elements supported from the wheel hub and in which the inner cushion face plates are welded to low carbon steel inserts carried by the high carbon steel wheel web and in which the outer cushion face plates are secured by welded joints to the cheek elements at locations sufficiently remote from the rubber cushions to avoid heat damage to the cushions during the welding of the parts. The above, and other related features of the invention will be fully apparent from consideration of the following detailed disclosure, when read in conjunction with the accompanying drawings and the appended claims.

In the drawings:

Figure 1 is a side elevation of a portion of the wheel illustrating a preferred embodiment of the herein claimed invention;

Figure 2 is a transverse section on line II—II of Figure 1;

Figure 3 is a detail section on line III—III of Figure 1;

Figure 4 is a detail section showing the welds uniting parts as described herein;

Figure 5 is a detail section on line V—V of Figure 1; and

Figure 6 is a perspective view of an insert of low carbon steel to facilitate welding parts later described herein.

Referring in detail to the drawings, 10 represents a conventional form of street railway car axle having a hub 12 secured thereto in any conventional or suitable manner. Adjacent the inner end of the hub 12 there is a circular plate 14 herein designated cheek element, this element being secured by welded seams 16 and 18 as shown. A frusto conical brace plate 20 is welded at 22 near the outer portion of the cheek element and is welded by a circular seam 24 to the hub.

Adjacent the outer end of the hub, I provide a circular plate 14$^a$ which is braced by a frusto conical plate 20$^a$, the member 14$^a$ being herein refererd to as the outer cheek element. The brace 20$^a$ is welded to the cheek element 14$^a$ by a seam weld 22$^a$ at its outer edge and at its inner portion is secured by a seam weld 24$^a$ to a sleeve 26 which is welded at 28 to the inner edge of cheek element 14$^a$. A key 30, fitted to a key seat 32 in a hub 12, serves to prevent relative rotation between cheek element 14$^a$ and the hub. The outer extremity of the hub 12 is provided with a portion of reduced diameter indicated at 34 to receive the sleeve portion 26 of the outer cheek element 14$^a$ and the extremity of the hub is screw threaded as indicated at 36 for coaction with a retainer nut 38 which has a frusto conical face 40 which matches the similarly formed face at the inner central portion of the reinforcing disc 20$^a$. The nut may be locked by stitch welds 39 as shown.

A wheel rim 42 of high carbon steel is provided with an integral radial web 44 of similar steel. This web is perforated at a multiplicity of points as indicated at 46, for the reception of low carbon steel inserts 48. The carbon content of rim 42 and web 44 is approximately .65% to .75% carbon, while the carbon content of the inserts 48 is from .15 to .25% carbon. The use of high carbon steel is desirable in wheel structures for street railway car use since it better resists wear. But the use of such high carbon steel presents a problem in welded structures because the welding heat will deleteriously affect the tendency toward cracking of high carbon steel. It is for this reason, among others, that I have adopted the herein claimed construction involving the use of low carbon steel inserts hereinafter more fully described.

Located on opposite sides of the web 44, cushions 50 and 52 of rubber, synthetic rubber or its equivalents are provided. It is broadly old in the art to use rubber cushions in this environment, and an example of such old use is found in Steward Patent No. 2,046,216, which issued June 30, 1936. While not limited thereto, the present invention is peculiarly well suited for use in the type of wheel shown in said Steward patent.

The inner rubber cushion 52 has inner and outer face plates 54 and 56 of low carbon steel vulcanized or otherwise securely bonded thereto. The outer cushion 50 is equipped with similar inner and outer face plates 56ᵃ and 54ᵃ. The outer face plates 54 and 54ᵃ are provided with annular peripheral outwardly bent flanges 58 and 58ᵃ which are secured at a series of circularly spaced points to the outer circumferential portions of the cheek elements 14 and 14ᵃ by short stitch welds 60 and 60ᵃ which serve to homogeneously unite the outer portions of the face plates to the cheek elements, these welds being located at points sufficiently remote from the rubber cushions to avoid heat damage to the rubber during the welding operation.

The inner cushion face plates 56 and 56ᵃ are of larger diameter than the circular cushions 50 and 52 and at radial locations substantially coinciding with the locations of the inserts 48, said inner face plates are provided with extensions 62 to facilitate welding of the face plate to said inserts. Each insert 48 for its greater portion is of a length approximately equal to the thickness of the web 44, thus the inner faces of the face plates in the assembled structure lie flush with the opposite faces of the web 44 and also are flush with the end faces of the greater portion of the inserts. However, the inserts, as shown in Figures 2 and 6, are formed with extensions 64, thus providing shoulders which overhang the inner face plates 56 and 56ᵃ. This arrangement is desirable since it facilitates the formation of the welded joints 66 which homogeneously unite extensions 62 of the face plates to the low carbon steel inserts 48.

The stitch welds 60 and 60ᵃ which unite the outer face plates to the inner and outer cheek plates are so located that two or three welded joints on each side of the wheel near the horizontal center line thereof are in vertical shear and carry an entire wheel load. The stitch welds 60 and 60ᵃ at the top and bottom of the wheel periphery, as thus arranged, are not subjected to load or flexure when in the wheel assembly there is clearance between the cheek plates and the projecting flanges 58 and 58ᵃ of the face plates. Since the welded joints 66, uniting the inner face plates to the wheel structure, are integrated with the overhanging projections 64 of the inserts, these welds are advantageously not subjected to shear, flexure, or stresses.

Since the wheel structure illustrated is designed for street railway car use in which power current flows through the wheel from the motors to the track rail, I provide the conventional bond wire or conductor 68 having one terminal 70 projecting through a suitable hole formed in the web 44 and another terminal 72 engaging a hole formed in the outer cheek element 14ᵃ. In order to facilitate assembly of the parts so as to properly locate the holes to receive the conductor terminals 70 and 72, I provide a locating pin 74, best shown in Figure 5, which passes through the registering holes formed in the web 44 and inner face plates 56 and 56ᵃ. This is merely a small diameter pin and is used for assembly purposes only and is not depended upon to take in radial load, and, in fact, may be removed after assembly if desired. For similar locating reasons during assembly, as shown in Figures 1 and 3, I provide inward projections 76 on the flanges 58 and 58ᵃ which engage notches 78 formed in the peripheral edges of the cheek elements 14 and 14ᵃ.

The herein described assembly and arrangement provides means for holding the component parts including the rubber cushions in proper operative condition without the necessity of maintaining the rubber under high pressures. Heretofore it has been a general practice to maintain the rubber cushions under pressures as high a 35,000 pounds. Such high pressure is objectionable because it tends to bring about an early permanent set in the rubber due to the static pressure and also due to the side thrust loadings encountered in normal street car operation. The assembled wheel structure shown and herein claimed is designed for low pressure assembly, and there need only be sufficient compression in the rubber cushions to compensate for irregularity and manufacturing tolerances. To provide such a low pressure assemblage requires that the cushion face plates be securely fastened to the wheel web and the inner and outer cheek plate and that the inner and outer cheek elements be secured in a manner sufficiently rigid and substantial to carry the combined radial torque and transverse operating loads. Heretofore the conventional means for securing parts in assembled relation has necessitated the use of rivets, bolts, and various transverse members. These can and have satisfactorily performed their functions, but their use requires a multiplicity of large openings or cut-outs for clearance at the outer periphery of the rubber cushions or requires large holes through the cushions. The presence of such holes or cut-outs involves high stress concentrations around the cut-out zones of the cushions and reduces the net cross sectional area of the rubber cushions and thus increases the loading per square inch of rubber due to the necessity of designing within a fixed wheel diameter and thus reduces the operating life of the rubber cushions. As compared with this inherent shortcoming of prior practice, the wheel constructed and arranged as herein shown and claimed, is entirely devoid of openings, cut-outs, or protuberances; in short, the rubber cushions are simple annular rings with continuous unbroken inner and outer edge faces and with radial side faces lying in parallel planes. The improved wheel makes possible important manufacturing economies since it eliminates mechanical connections piercing the rubber cushions and it eliminates special costly manufacturing equipment necessary when using rubber or equivalent cushions having cut-outs or protuberances. By use of the plain rubber or equivalent flat ring-like cushions devoid of openings or protuberances, the cross sectional area of rubber cushion for the given size wheel is increased to the maximum possible and at the same time the working stresses per square inch of rubber is reduced to a minimum. For these reasons, if desired, a smaller diameter wheel can be used to give service comparable to that of larger wheels as constructed by prior art designs. By the design illustrated, involving low pressure assembly and maximum rubber cushion area with no high stress concentration points (due to the lack of cut-outs or openings) the life of the rubber cushion is estimated to have been increased approximately 50%, and the herein specificially described manner of securing the face plates to the low carbon steel inserts permits integrating the parts homogeneously by conventional welding methods without impairing the characteristics of high carbon steel due to the welding heat. The specific form and arrangement and location of the stitch welds 60 homogeneously uniting the outer cushion face plates to the inner and outer cheek elements is such that the heat of the welding operation will not injure or have any harmful effect on the resilient action of the rubber or synthetic rubber cushion members.

While I have herein described specific features of design and arrangement of a preferred construction, it is not to be construed that I am limited thereto, since various changes and substitutions of equivalents may be made by those skilled in the art without departure from the invention as defined in the appended claims.

I claim:

1. A resilient car wheel comprising web and rim portions, a hub separated therefrom, rubber or equivalent cushions, inner and outer face plates secured thereto, inner and outer cheek elements secured to said hub, the cheek elements being in engagement with the outer face plates of said cushions, each outer face plate having an out-turned annular flange surrounding the cheek element adjacent thereto, welds uniting said annular flanges to said cheek elements at points spaced sufficiently remote from said cushions to avoid heat damage thereto, metal plugs seated firmly in holes in the web of the wheel, respective welded joints uniting said plugs to said inner face plates.

2. A resilient car wheel comprising web and rim portions, a hub separated therefrom, non-metallic cushions interposed between inner and outer face plates, inner and outer cheek elements secured to said hub, the cheek elements being in engagement with said outer face plates, welds securing said outer face plates to said inner and outer cheek elements, plugs piercing the web of the wheel and having shouldered portions overhanging the peripheral edges of said inner face plates and respective welds uniting said overhanging portions of the plugs to the peripheral edges of said inner face plates.

3. A resilient car wheel comprising integral metal web and rim portions, a hub separated therefrom, inner and outer cheek elements supported by said hub, rubber or equivalent cushions of circular form each having a central opening through which said hub freely passes, the outer edges of said cushions being continuous and devoid of depressions or cut-outs, and the inner and outer radial faces thereof being continuous unbroken plane surfaces devoid of openings or projections, inner and outer metallic face plates bonded to the opposite faces of said cushions, a series of metal inserts projecting through holes in said web and welded to the peripheral edge portions of said inner face plates, said outer face plates each having an annular flange overlapping the adjacent cheek element and respective stitch welds uniting said annular flanges to said cheek elements at spaced intervals.

4. A wheel comprising a hub carrying two radially extending cheek elements one rigidly secured to the hub and the other axially adjustable thereon, a pair of rubber or equivalent cushions each having inner and outer low carbon steel face plates bonded thereto, the inner face plates extending radially beyond said cushions, a high carbon steel wheel rim having an integral web of high carbon steel extending radially inward between said cheek elements and spaced therefrom by said cushions and the face plates thereof, low carbon steel inserts fitted to recessed seats formed in said rim, seams of weld metal homogeneously uniting portions of said inner face plates beyond the cushions to said inserts, each of said outer face plates having an out-turned annular flange overlapping the peripheral edge of the cheek element adjacent thereto and a plurality of circularly spaced seams of weld metal homogeneously uniting the out-turned flanges of said outer face plates to the cheek elements which they overlap.

ARTHUR R. SCHULZE.

REFERENCES CITED

The following references are of record in the file of this patent:

UNITED STATES PATENTS

| Number | Name | Date |
| --- | --- | --- |
| 1,407,202 | Kubler | Feb. 21, 1922 |
| 2,167,633 | Burrows | Aug. 1, 1939 |
| 2,175,118 | Hirshfeld | Oct. 3, 1939 |
| 2,263,884 | Malmquist | Nov. 25, 1941 |